Figure 1:
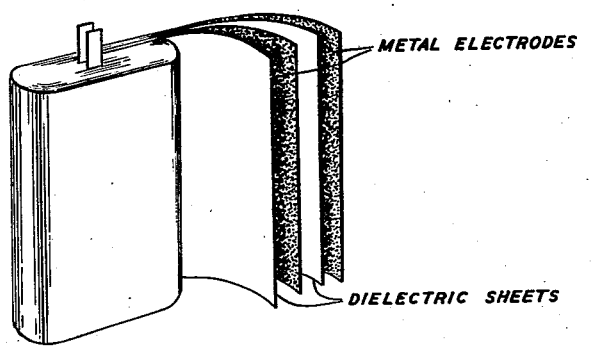

Oct. 21, 1941.            D. A. McLEAN            2,259,978
            CONDENSER DIELECTRIC AND METHOD OF PREPARING IT
                            Filed Aug. 31, 1938

METAL ELECTRODES

DIELECTRIC SHEETS

DIELECTRIC CONTAINING
HALOGENATED MATERIAL
AND CHEMICALLY COMBINED
LEAD, SILVER OR MERCURY.

METAL ELECTRODES

INVENTOR
D. A. McLEAN
BY
        ATTORNEY

Patented Oct. 21, 1941

2,259,978

UNITED STATES PATENT OFFICE 2,259,978

CONDENSER DIELECTRIC AND METHOD OF PREPARING IT

David A. McLean, East Orange, N. J., assignor to Bell Telephone Laboratories, Incorporated, New York, N. Y., a corporation of New York Application August 31, 1938, Serial No. 227,653

3 Claims. (Cl. 92—21)

The present invention relates to condenser dielectrics and to methods of preparing them. More particularly, it relates to condenser dielectrics containing halogenated dielectric materials and also containing substances which tend to prolong the life of the dielectric. It also relates to methods of rendering dielectrics more resistant to the chemical action of halogenated impregnants.

Certain halogenated substances, or more particularly certain halogenated carbon compounds such as the halogenated cyclic hydrocarbons, which possess a high dielectric constant, high resistance, low dielectric loss and high chemical stability are very desirable as condenser dielectrics. Chlorinated substances, such as the chlorinated hydrocarbons, chlorinated diphenyl and chlorinated naphthalene, are most commonly used for this purpose. Ordinarily they are employed by impregnating them in porous spacers such as paper, textiles or other cellulosic materials.

According to the present invention, it has been found that the life of condensers containing this type of dielectric can be considerably prolonged and that the ultimate failure of the dielectric, particularly when the condensers are operating under direct current potentials and at elevated temperatures, can be postponed by incorporating in the dielectric certain materials which act as stabilizers for the halogenated materials. The ultimate failure of cellulosic dielectrics containing halogenated materials appears to be due to the disintegration of the cellulose. Inspection of an impregnated paper dielectric of this type after failure shows it to be spotted with carbonized and decomposed areas.

Although the invention is not to be limited to any theory of operation, it is believed that the failure of the dielectric is due to the fact that the halogenated impregnants, such as chlorinated naphthalene and chlorinated diphenyl, although they are ordinarily considered stable, tend to decompose slightly, particularly under the influence of an electrical field, to form traces of halogenated compounds, chiefly hydrohalogen acids such as hydrochloric acid. The decomposition process is autocatalytic in that the trace of hydrohalogen acid formed tends to accelerate the further decomposition of the halogenated impregnants. The presence of this hydrohalogen acid, which acts as an electrolyte, decreases the resistance of the dielectric in the areas in which it is concentrated and in the case of an impregnated paper dielectric, the combined electrical and chemical action causes destruction of the paper spacer. The acid is also objectionable since it tends to corrode the metal electrodes of the condenser.

When aluminum electrodes are employed in the condenser, as is often preferable, reactions involving traces of hydrohalogen acids such as hydrochloric acid, for example, are particularly objectionable due to the fact that the free hydrohalogen acid with the aluminum causes the formation of aluminum halides such as aluminum chloride. Aluminum chloride, for example, is known to be a catalyst for the decomposition of chlorinated organic materials. Thus, the catalytic action of the aluminum chloride accelerates the decomposition of the chlorinated materials to form additional hydrochloric acid. Both the aluminum halide and the hydrohalogen acid cause the breakdown of the cellulose in the paper spacer and consequent failure of the dielectric.

According to the present invention, the destructive action of the halogenated dielectric materials is avoided by adding to the dielectric a metal in combined form capable of reacting with a hydrohalogen acid to form an insoluble halide, such as lead, silver and mercury in combined form. Various compounds of these metals which are capable of reacting with hydrohalogen acids may be used and the compounds can be added to or formed in the dielectric in any suitable manner. It has been found that the life of the condensers is materially increased when these substances are added.

The presence of compounds of these metals in the dielectric is believed to remove effectively the traces of hydrohalogen acids generated by the decomposition of the halogenated dielectric materials. As soon as a trace of hydrohalogen acid is generated, it reacts with one of the metal compounds to form an insoluble halide. Since the hydrogen ion of the acid reacts to form a compound with the element or radical originally combined with the metal, it is necessary that such element or radical be capable of forming a compound with hydrogen which is not detrimental to the life or electrical properties of the dielectric.

Particularly suitable compounds of lead, silver and mercury are the oxides and the salts with a weak acid. Salts of the weakly ionizable organic and inorganic acids, such as boric, carbonic, citric or acetic, may be used. However, much more desirable are the salts formed with the very weak organic acids, such as those contained in the pectins, gum arabic, cherry gum or other carbohydrate gums, and the acid carbohydrate derivatives, such as, for example, the gluconic or uronic acids. The gums or pectins should contain at least 1 per cent of lead, silver or mercury by weight in chemical combination and preferably 3 per cent or more.

Commercial gums and pectins contain small amounts of acidic substances partly free and partly in chemical combination with metallic elements, chiefly calcium and magnesium. It is with these acidic substances that the lead, silver and mercury combine by replacing the other metallic elements or the hydrogen of the acids. However, since as a practical matter the commercial gums and pectins may be considered as crude acids or salts without reference to their individual constituents, the metallic elements may be referred to as combined with the gums or pectins as a whole.

Carbohydrates also contain hydrogen atoms which may be considered of a weakly acidic nature in that they may be replaced by lead, silver and mercury. The lead, silver and mercury compounds with the carbohydrates may also be employed as stabilizers according to the present invention.

These metallic compounds may be added to the dielectric in any suitable manner. When a porous spacer is used, the compounds may be impregnated in the finished spacer either in the form of a solution or a suspension or by precipitating in the spacer an insoluble compound from a solution of a soluble salt. When a paper spacer is employed, the metal compounds may be mixed with the paper pulp prior to the formation of the paper sheet. This is by far the preferable method of incorporating the metal compounds in paper since they are more evenly distributed throughout the sheet and since preformed paper sheets tend to disintegrate when exposed to the action of a liquid for sufficient time to incorporate metal compounds therein.

Since only traces of hydrohalogen acids are formed by the decomposition of halogenated dielectric materials, it is necessary to add only a small amount of the lead, silver or mercury inhibitor. Preferably, at least .2 per cent of the inhibitor by weight of the dielectric is added. The upper limit is set only by the amount of metal compound which destroys the desirable electrical properties of the dielectric. Concentrations of the inhibitor as high as 5 to 10 per cent by weight of the dielectric may be used.

Figure 2:
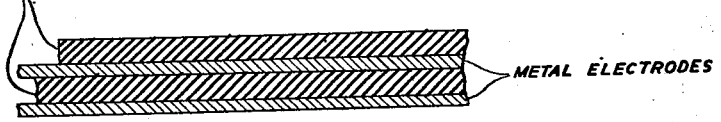

One form of condenser in which the dielectric of the present invention may be used is illustrated in the drawing in which:

Fig. 1 represents a simple rolled condenser made up of two electrodes separated by two dielectric sheets; and Fig. 2 shows a cross-section of the electrodes with the dielectric therebetween containing a halogenated dielectric material together with a compound of lead, silver or mercury.

Fig. 1 shows a rolled condenser made up of alternate layers of metal foil, such as aluminum or tin foil, and a dielectric material. Such a condenser may be prepared by incorporating the desired stabilizer in a sheet of cellulosic material, such as paper, and placing the desired number of dielectric sheets between two or more layers of metal foil. The alternate layers of dielectric and metal may then be rolled into the condenser shown in Fig. 1 and dipped into a bath of the halogenated impregnating material. The condenser may then be placed in a case or utilized as desired. Fig. 2 shows a section of one turn of the finished rolled condenser showing the alternate metal and dielectric layers. The finished dielectric contains a stabilizer together with the halogenated dielectric material.

As a specific example of the formation of a condenser according to the present invention, lead oxide is added to a linen paper pulp in an amount sufficient to yield about 2 per cent of the oxide in the finished paper. When the oxide is uniformly dispersed, the pulp is formed into a sheet, dried and calendered according to the usual procedure for making paper. A condenser is then formed in the usual manner using the paper as a dielectric and aluminum sheets as electrodes. The condenser is then dipped in a body of chlorinated naphthalene maintained at a temperature somewhat above the melting point of the chlorinated naphthalene. When the paper has become thoroughly impregnated, the condenser is removed and allowed to cool.

Silver oxides, mercury oxides, lead acetate, silver acetate, mercuric acetate, or gum arabic containing about 5 per cent of lead, silver or mercury in organic combination are incorporated in a similar manner. Chlorinated diphenyl may be used as the impregnant in place of chlorinated naphthalene. Other condenser papers, such as rag paper may be formed and used in this manner.

As a further specific example of the present invention, a solution of lead acetate is sprayed upon a sheet of linen paper after formation from the pulp but just prior to the passage of the paper through the drying rolls. Sufficient of the solution is sprayed to produce about 2 per cent of the lead compound in the finished paper. The paper is then formed into a condenser and impregnated with chlorinated naphthalene as described above.

Lead formate, lead citrate, mercuric acetate and silver acetate are similarly incorporated in the paper by spraying on the paper sheet in the form of a solution prior to drying.

Although satisfactory results are obtained by the incorporated of lead, silver or mercury compounds, as such, in a cellulosic dielectric as described above, preferably the metallic constituents are added to a cellulosic material by forming what is believed to be a metallic compound of one of the constituents of the cellulose. This is accomplished by contacting the cellulosic material with an aqueous solution of a soluble salt of lead, silver or mercury and subsequently washing the material free of soluble ions. A proportion of the metal is retained by the cellulose in what is believed to be chemical combination. It has been found that cellulosic materials, such as wood, jute, Manila hemp, true hemp, caroa, straw or grass fibres, which contain a relatively large amount of beta and gamma cellulose, for instance about 10 per cent to 20 per cent, absorb larger quantities of the metal ions than do other cellulosic materials, such as the linen paper or rag paper commonly used for condenser dielectrics which are composed largely of alpha cellulose (about 98 per cent or 99 per cent, or higher) and normally do not contain more than about 1 per cent or 2 per cent beta and gamma cellulose. It is believed that this greater absorption of the metals is due to the fact that the metal ions combine either exclusively or primarily with the pentosans or polyuronides which are associated with beta and gamma cellulose to form insoluble compounds.

When paper is employed as the dielectric, either the finished paper sheet or the paper pulp from which the sheet is formed may be treated with the salt solution to form the metal compound with the cellulosic constituent. As a specific example of such treatment, linen paper pulp is soaked in a one-tenth normal solution of lead acetate and is subsequently washed with distilled water until the wash water shows no trace of lead. The pulp is then formed into a sheet, dried and calendered according to the usual procedure for forming paper. The treated paper is then impregnated with chlorinated naphthalene or chlorinated diphenyl and formed into a condenser.

The concentration of the lead salt solution is not of great importance and can be varied from about one-hundredth normal to about saturation. Other soluble lead salts can be used in the above procedure, such as lead formate, lead nitrate and lead citrate. In each case rag paper pulp can be substituted for linen paper pulp, as can wood pulp, Manila pulp, or a pulp made up of a mixture of wood and linen, wood and rag, Manila and linen or Manila and rag.

The same pulps are treated with one-tenth normal solutions of silver acetate, silver nitrate, mercuric acetate and mercuric nitrate, according to the procedure described above in connection with lead, when it is desired to combine the cellulosic material with these other metals.

As another specific example of the invention, a finished linen condenser paper is soaked in a one-tenth normal solution of lead nitrate until thoroughly saturated. It is then washed until the wash water shows no trace of lead and passed through heated rolls to dry the paper. The treated paper is then formed into a condenser and impregnated with chlorinated naphthalene.

Rag paper, kraft paper, Manila paper or the mixed papers described above may also be treated in the finished form in place of linen paper according to the procedure just described. Cellulosic textiles such as cotton fabrics may also be treated in this manner for use in condenser dielectrics.

Chemically combining the ions of lead, silver or mercury with a constituent of the cellulose is an ideal way of preparing paper for use as a spacer in a dielectric since the reaction which is believed to take place with the free hydrohalogen acids leaves no electrolytes in the dielectric. The metallic components combine to form halides which, due to their insolubility, have no detrimental effect upon the dielectric. The only other product of the reaction is the original component of cellulose with which the metallic element was combined.

Any paper may be treated in this manner. However, where it is desirable to incorporate a larger amount of the metallic elements than is commonly taken up by the linen or rag papers which are frequently used for condenser dielectrics, kraft paper or other wood pulp paper may be used. Certain composite papers made up of linen, cotton, or similar fibres combined with wood pulp, jute or Manila hemp fibres may also be desirable since they combine the features of high initial breakdown strength and low power factor possessed by the linen fibres with the ability to combine with large amounts of lead, silver and mercury possessed by the other fibres. When such composite papers are used, they may contain between about 25 and 50 per cent of the fibres high in beta and gamma cellulose, the remainder being alpha cellulose fibres. Preferably the high beta and gamma cellulose fibres constitute between 30 and 40 per cent of the paper or specifically 35 per cent.

The use of cellulosic fibres containing large amounts of beta and gamma cellulose, which absorb larger proportions of metal ions, for use in condenser dielectrics is more particularly described and claimed in the copending application of G. T. Kohman Serial No. 227,663, filed August 31, 1938.

Although the invention has been described with reference to specific examples, it is to be understood that it is of broad application and is to be limited only by the scope of the appended claims.

What is claimed is:

1. The method of preparing a paper dielectric which comprises incorporating in the paper a salt of a carbohydrate gum with a metal selected from the group consisting of lead, silver and mercury.

2. The method of preparing a paper dielectric which comprises incorporating in the paper a salt of gum arabic with a metal selected from the group consisting of lead, silver and mercury.

3. The method of preparing a paper dielectric which comprises adding to paper pulp an oxide of a metal selected from the group consisting of lead, silver and mercury, forming a sheet of paper from said pulp and impregnating said sheet with a halogenated dielectric material selected from the group consisting of chlorinated naphthalene and chlorinated diphenyl.

DAVID A. McLEAN.